United States Patent
Koehler et al.

(10) Patent No.: US 11,285,865 B2
(45) Date of Patent: Mar. 29, 2022

(54) METHOD FOR CONTROLLING AT LEAST ONE LIGHT MODULE OF A LIGHT UNIT OF A VEHICLE, LIGHT UNIT, COMPUTER PROGRAMME PRODUCT, AND COMPUTER-READABLE MEDIUM

(71) Applicant: HELLA GmbH & CO KGAA, Lippstadt (DE)

(72) Inventors: Susanne Koehler, Lippstadt (DE); Boris Kubitza, Moehnesee-Koerbecke (DE); Carsten Wilks, Lippstadt (DE); Juergen Locher, Detmold (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 45 days.

(21) Appl. No.: 16/805,166

(22) Filed: Feb. 28, 2020

(65) Prior Publication Data
US 2020/0198527 A1 Jun. 25, 2020

Related U.S. Application Data

(63) Continuation of application No. PCT/EP2018/072470, filed on Aug. 21, 2018.

(30) Foreign Application Priority Data

Aug. 28, 2017 (DE) ...................... 10 2017 119 394.4

(51) Int. Cl.
*B60Q 1/14* (2006.01)
*H05B 47/125* (2020.01)
(Continued)

(52) U.S. Cl.
CPC ............ *B60Q 1/1423* (2013.01); *B60Q 1/24* (2013.01); *G06K 9/00805* (2013.01);
(Continued)

(58) Field of Classification Search
CPC .......... B60Q 1/16; B60Q 1/24; B60Q 1/1423; B60Q 2300/45; B60Q 2300/054;
(Continued)

(56) References Cited

U.S. PATENT DOCUMENTS 6,281,806 B1 * 8/2001 Smith .................... B60Q 1/085
340/901
6,327,522 B1 * 12/2001 Kojima .................. B60K 35/00
701/1
(Continued)

FOREIGN PATENT DOCUMENTS

DE 10 2007 053 138 A1 1/2009
DE 10 2008 025 947 A1 12/2009
(Continued)

*Primary Examiner* — Abdullah A Riyami
*Assistant Examiner* — Syed M Kaiser
(74) *Attorney, Agent, or Firm* — Muncy, Geissler, Olds & Lowe, P.C.

(57) ABSTRACT

A method and device for controlling at least one light module of a lamp unit of a vehicle, comprising a light controller and a surroundings detection device, the front surroundings of the vehicle being illuminated with the aid of the light controller and the light module, depending on an object classified as relevant. The lamp unit has a luminance detection device for detecting the luminances of the detected object classified as relevant in the front surroundings of the vehicle and object surroundings of the front surroundings around this object, and the front surroundings of the vehicle are illuminated, depending on the luminance contrast between the object and the object surroundings.

9 Claims, 3 Drawing Sheets

Legend
6 = surroundings detection device
12 = luminance detection device
4 = light controller
4.1 = memory
2 = light modules

(51) Int. Cl.
*B60Q 1/24* (2006.01)
*B60Q 1/16* (2006.01)
*H05B 45/10* (2020.01)
*G06K 9/00* (2022.01)
*G08G 1/01* (2006.01)

(52) U.S. Cl.
CPC ............ *G08G 1/0133* (2013.01); *H05B 45/10* (2020.01); *H05B 47/125* (2020.01); *B60Q 1/16* (2013.01); *B60Q 2300/054* (2013.01); *B60Q 2300/45* (2013.01)

(58) Field of Classification Search
CPC .......... B60Q 1/08; B60Q 1/085; B60Q 1/143; B60Q 2300/05; H05B 47/125; G06K 9/00805; G06K 9/00791; G06K 9/00369; G08G 1/0133; H04N 9/3182; B60R 1/00
See application file for complete search history.

(56) References Cited

U.S. PATENT DOCUMENTS

| | | | | |
|---|---|---|---|---|
| 7,474,765 | B2* | 1/2009 | Nagaoka | G06K 9/00651 382/103 |
| 7,782,184 | B2* | 8/2010 | Wittorf | G06K 9/00805 340/468 |
| 8,070,332 | B2* | 12/2011 | Higgins-Luthman | B60Q 1/085 362/465 |
| 9,292,735 | B2* | 3/2016 | Nagaoka | H04N 5/33 |
| 9,481,292 | B2 | 11/2016 | Faber et al. | |
| 9,925,914 | B2* | 3/2018 | Schlaug | B60Q 1/085 |
| 10,089,537 | B2* | 10/2018 | Nix | G06K 9/00805 |
| 10,121,083 | B2* | 11/2018 | Kasaoki | G06T 7/70 |
| 10,521,679 | B2* | 12/2019 | Tokita | G06T 7/73 |
| 10,523,904 | B2* | 12/2019 | Mahmoud | H04N 5/23241 |
| 2004/0021853 | A1* | 2/2004 | Stam | G01J 1/32 356/218 |
| 2004/0218401 | A1* | 11/2004 | Okubo | B60Q 1/10 362/526 |
| 2005/0100192 | A1* | 5/2005 | Fujimura | G06K 9/00805 382/103 |
| 2005/0111698 | A1* | 5/2005 | Kawai | B60R 1/00 382/103 |
| 2008/0175012 | A1* | 7/2008 | Shimaoka | B60Q 1/085 362/464 |
| 2008/0297374 | A1* | 12/2008 | Usami | G08G 1/167 340/935 |
| 2009/0009089 | A1* | 1/2009 | Burkett | H05B 47/16 315/82 |
| 2012/0206050 | A1* | 8/2012 | Spero | F21S 41/147 315/152 |
| 2012/0226411 | A1* | 9/2012 | Kuoch | G08G 1/166 701/36 |
| 2013/0038736 | A1* | 2/2013 | Yamamura | F21S 41/36 348/148 |
| 2013/0058116 | A1* | 3/2013 | Galbas | B60Q 1/48 362/512 |
| 2013/0265561 | A1* | 10/2013 | Takahira | G02B 6/0005 356/3 |
| 2014/0098997 | A1* | 4/2014 | Faber | G06K 9/00791 382/103 |
| 2014/0257644 | A1* | 9/2014 | Galbas | B60Q 1/085 701/49 |
| 2015/0048736 | A1* | 2/2015 | Foltin | B60Q 1/143 315/82 |
| 2015/0371097 | A1* | 12/2015 | Park | H04N 5/2352 382/104 |
| 2016/0046288 | A1* | 2/2016 | Pawlicki | B60W 10/04 701/41 |
| 2017/0203682 | A1* | 7/2017 | Atsmon | B60Q 1/085 |
| 2018/0253609 | A1* | 9/2018 | Potter | B60Q 1/2603 |
| 2018/0312125 | A1* | 11/2018 | Jung | G01S 17/89 |
| 2019/0007626 | A1* | 1/2019 | Kirsch | G06T 7/13 |
| 2019/0351824 | A1* | 11/2019 | Kim | G06K 9/00791 |

FOREIGN PATENT DOCUMENTS

| | | | |
|---|---|---|---|
| DE | 10 2008 058 386 A1 | 5/2010 | |
| DE | 10 2011 004 937 | 9/2012 | |
| DE | 10 2011 077 282 A1 | 12/2012 | |
| DE | 10 2011 081 382 A1 | 2/2013 | |
| DE | 10 2012 003 158 A1 | 8/2013 | |
| DE | 10 2013 002 320 A1 | 8/2014 | |
| DE | 10 2014 221 647 A1 | 4/2016 | |
| DE | 10 2015 012 019 A1 | 3/2017 | |
| EP | 2 537 709 A2 | 12/2012 | |
| EP | 2537709 A2 * | 12/2012 | ........... G06K 9/2027 |
| WO | WO 2017/019725 A1 | 2/2017 | |

\* cited by examiner

Legend
6 = surroundings detection device
12 = luminance detection device
4 = light controller
4.1 = memory
2 = light modules Legend
6 = surroundings detection device
12 = luminance detection device
4 = light controller
4.1 = memory
2 = light modules Legend
6 = surroundings detection device
12 = luminance detection device
4 = light controller
4.1 = memory
2 = light modules

METHOD FOR CONTROLLING AT LEAST ONE LIGHT MODULE OF A LIGHT UNIT OF A VEHICLE, LIGHT UNIT, COMPUTER PROGRAMME PRODUCT, AND COMPUTER-READABLE MEDIUM

This nonprovisional application is a continuation of International Application No. PCT/EP2018/072470, which was filed on Aug. 21, 2018, and which claims priority to German Patent Application No. 10 2017 119 394.4, which was filed in Germany on Aug. 28, 2017, and which are both herein incorporated by reference.

BACKGROUND OF THE INVENTION

Field of the Invention

The present invention relates to a method for controlling at least one light module of a lamp unit of a vehicle, a lamp unit for a vehicle, a computer program product and a computer-readable medium.

Description of the Background Art

Methods for controlling at least one light module of a lamp unit of a vehicle, lamp units for a vehicle, computer program products and computer-readable media are already known in numerous design variants from the prior art.

For example, a method and a device for projecting a laser light image into surroundings of a vehicle are known from DE 10 2012 003 158 A1. To increase the visibility of objects detected and classified as relevant in the surroundings of a vehicle under poor visibility conditions, it is propose to optimize recorded images of the surroundings of the vehicle with regard to contrast, color and luminance with the aid of a processing device and to project the images optimized in this manner into the vehicle surroundings.

SUMMARY OF THE INVENTION

It is therefore an object of the present invention to improve the visibility of objects detected and classified as relevant in front surroundings of a vehicle.

This object is achieved in an exemplary embodiment by a method for controlling at least one light module of a lamp unit of a vehicle, a lamp unit for a vehicle, a computer program product and a computer-readable medium.

In an exemplary embodiment, the illumination of the front surroundings of the vehicle takes place with regard to a luminance contrast optimization between an object detected in the front surroundings of the vehicle and classified as relevant and the object surroundings thereof. The visibility of objects classified as relevant in the front surroundings of the vehicle is improved hereby, even under poor visibility conditions.

The object detected with the aid of the surroundings detection device is classified as a relevant object depending on the danger potential for the vehicle and/or the object with the aid of the light controller. In this way, a particularly sensible means for classifying the relevance of an object detected with the aid of the surroundings detection device is specified.

A positive contrast of the object or a negative contrast of the object, with respect to the object surroundings in each case, is determined with the aid of the light controller and depending on the ascertained luminance contrast between the object classified as relevant and the object surroundings, and if a positive contrast exists, a light intensity of the light module is increased in the area of this object, and if a negative contrast exists, the light intensity of the light module is reduced in the area of this object. The method according to the invention is particularly easily implemented hereby.

The visibility is improved by increasing the light intensity in the area of the object when a positive contrast of the object with respect to its object surroundings is determined. If a negative contrast of the object with respect to its object surroundings is determined, an improvement of the visibility is not achievable by an increase in the light intensity in the area of the object but rather by a reduction of the light intensity in this area. A positive contrast of a detected object classified as relevant with respect to its object surroundings is present if the object stands out brightly against the dark object surroundings. Conversely, a negative contrast of a detected object classified as relevant with respect to its object surroundings is present if the object stands out darkly against the bright object surroundings.

The light intensity in the area of the object is increased or reduced by a predefined absolute value stored in a memory of the light controller. In this way, the method according to the invention is further simplified.

The increase in or reduction of the light intensity takes place depending on a value of the luminance contrast between the object and the object surroundings. The light intensity is therefore not increased or reduced by a predefined value but rather by a relative value.

When detecting the luminances with the aid of the luminance detection device, the object detected with the aid of the surroundings detection device and classified as relevant with the aid of the light controller is illuminated at a light intensity automatically varied within a detection period of the luminances from a light intensity variation range of the light module, and the front surroundings of the vehicle are illuminated at a time after the detection of the luminances during a normal operation of the lamp unit, at least in an area of the object, at the light intensity from the light intensity variation range, for which the luminance contrast between the object and the object surroundings is at its maximum within the technical limits of the lamp unit. The light intensity of the light module, and thus the illumination of the front surroundings of the vehicle, is optimally adaptable hereby to the particular conditions in the present driving situation of the vehicle.

A totality of the detected object classified as relevant and its object surroundings is divided into subareas, and the light intensity of the light module during a normal operation of the lamp unit is formed in each of the subareas in such a way that the luminance contrast between the object and its object surroundings is at its maximum for each of the subareas. In this way, the light intensity of the light module may be particularly effectively optimized in the area of the detected object classified as relevant with regard to the luminance contrast between the object and its object surroundings. This is advantageous, particularly in the case of large objects or objects which are situated or move in a transitional area of differing luminances.

An embodiment, which is associated with the formation of a totality of a detected object classified as relevant and its object surroundings, and the division thereof into subareas, provides that the luminance detection device for detecting the luminances of the detected object classified as relevant detects the luminances of the object and its object surroundings for the individual subareas of the totality in the front surroundings of the vehicle and in object surroundings of the front surroundings around this object.

The object surroundings of the object classified as relevant are illuminated in such a way that the object surroundings are able to be perceived by a vehicle driver of the vehicle in part as an object shadow of the object classified as relevant. The visibility of a detected object classified as relevant is further improved hereby, since objects in a space, for example in the front surroundings of the vehicle, are easier to perceive visually with a shadow. For example, it may be provided to not eclipse a real object shadow of the object in the object surroundings with the aid of the light model or to cause the real object shadow to stand out even more clearly with the aid of the light module. However, it is also conceivable add a virtual object shadow to a detected object classified as relevant in the object surroundings with the aid of a light module. The profile of a virtual object shadow of this type may be formed, for example, depending on other shadows detected in the front surroundings of the vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
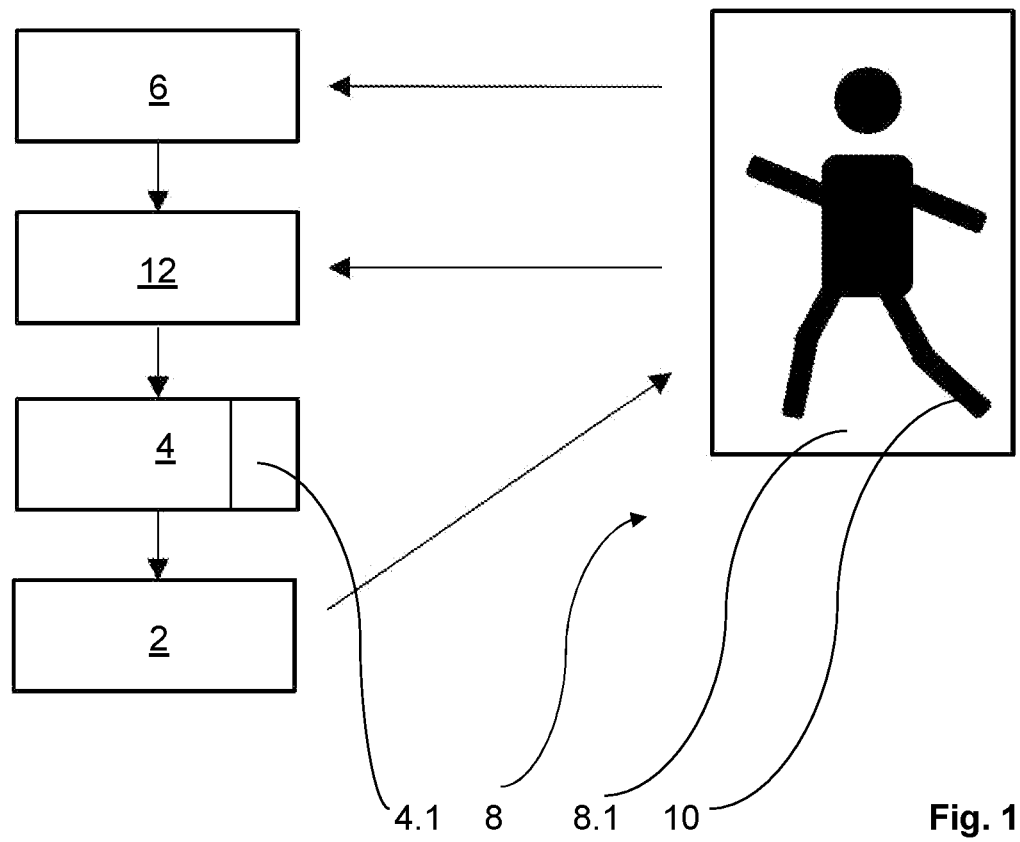
FIG. 1 shows an exemplary embodiment of the lamp unit according to the invention in a partial representation.

The invention is explained in greater detail below on the basis of three exemplary embodiments. The same elements and objects, or those having the same functions, are provided with the same reference numerals. The following exemplary embodiments are described only with reference to their differences from the preceding exemplary embodiments. Otherwise, reference is hereby made to the explanations of the preceding exemplary embodiment in each case.

An exemplary embodiment of the lamp unit according to the invention for a vehicle designed as a motor vehicle is partially illustrated in FIG. 1. The motor vehicle itself is not shown. The lamp unit comprises two light modules 2, a light controller 4 for automatically controlling light modules 2, a surroundings detection device 6 designed as a front camera for detecting an object 10 present in front surroundings 8 of the motor vehicle. Object 10 may be classified as a relevant object 10 with the aid of light controller 4 depending on a danger potential for the vehicle and/or object 10. Each of the two light modules 2 is installed in a main headlamp of the motor vehicle, which is not illustrated, and is controllable with the aid of light controller 4 and depending on object 10 detected with the aid of front camera 6 and classified as relevant with the aid of light controller 4 for illuminating front surroundings 8 of the motor vehicle.

According to the exemplary embodiment, the lamp unit also comprises a luminance detection device 12 for detecting the luminances of an object 10, detected in front surroundings 8 of the motor vehicle with the aid of front camera 6, and object surroundings 8.1 around detected object 10 classified as relevant with the aid of light controller 4. Object surroundings 8.1 are part of front surroundings 8 of the motor vehicle.

The method according to the invention is explained in greater detail below according to the present first exemplary embodiment, based on FIG. 1.

The motor vehicle travels in vehicle surroundings on a lane, which is not illustrated. Front surroundings 8 of the motor vehicle are situated in front of the vehicle in the direction of travel. Front surroundings 8 are first illuminated in the manner known to those skilled in the art with the aid of the main headlamps comprising the two light modules 2. Front surroundings 8 of the motor vehicle are recorded with the aid of front camera 6. Once front camera 6 has detected object 10 in front surroundings 8 of the motor vehicle, this is forwarded to light controller 4 in the manner known to those skilled in the art.

The relevance of detected object 10 is classified with the aid of light controller 4, depending on a danger potential for the motor vehicle and/or object 10. For example, object 10 detected with the aid of front camera 6 could be identified in light controller 4 as a pedestrian 10. If pedestrian 10 is in the vicinity of the lane of the motor vehicle, pedestrian 10 could be classified as an object 10 having danger potential, i.e. as a relevant object 10. If, in contrast, the pedestrian is farther away from the lane of the motor vehicle, the pedestrian could be classified as an object without danger potential, i.e. not as a relevant object.

If object 10, for example pedestrian 10, is classified as a relevant object 10 with the aid of light controller 4, light controller 4 controls luminance detection device 12 for detecting the luminance of object 10 and for detecting the luminance of object surroundings 8.1 of front surroundings 8 around object 10. The luminances of object 10 and object surroundings 8.1 of object 10 detected with the aid of luminance detection device 12 are forwarded to light controller 4 in the manner known to those skilled in the art and compared with each other in light controller 4.

If the comparison of the two luminances detected by luminance detection device 12 yields a positive contrast of object 10 relative to its object surroundings 8.1, i.e. if object 10 stands out brightly thereagainst in comparison to object surroundings 8.1 that are darker than object 10, the light intensity in the area of object 10 is increased by a predefined absolute value stored in a memory 4.1 of light controller 4 with the aid of light controller 4 and light modules 2. If the comparison of the two detected luminances yields a negative contrast of object 10 relative to its object surroundings 8.1, i.e. if object 10 stands out darkly thereagainst in comparison to object surroundings 8.1 that are brighter than object 10, the light intensity in the area of object 10 is decreased, i.e. reduced, by a predefined absolute value stored in memory 4.1 of light controller 4 with the aid of light controller 4 and light modules 2.

Figure 2:
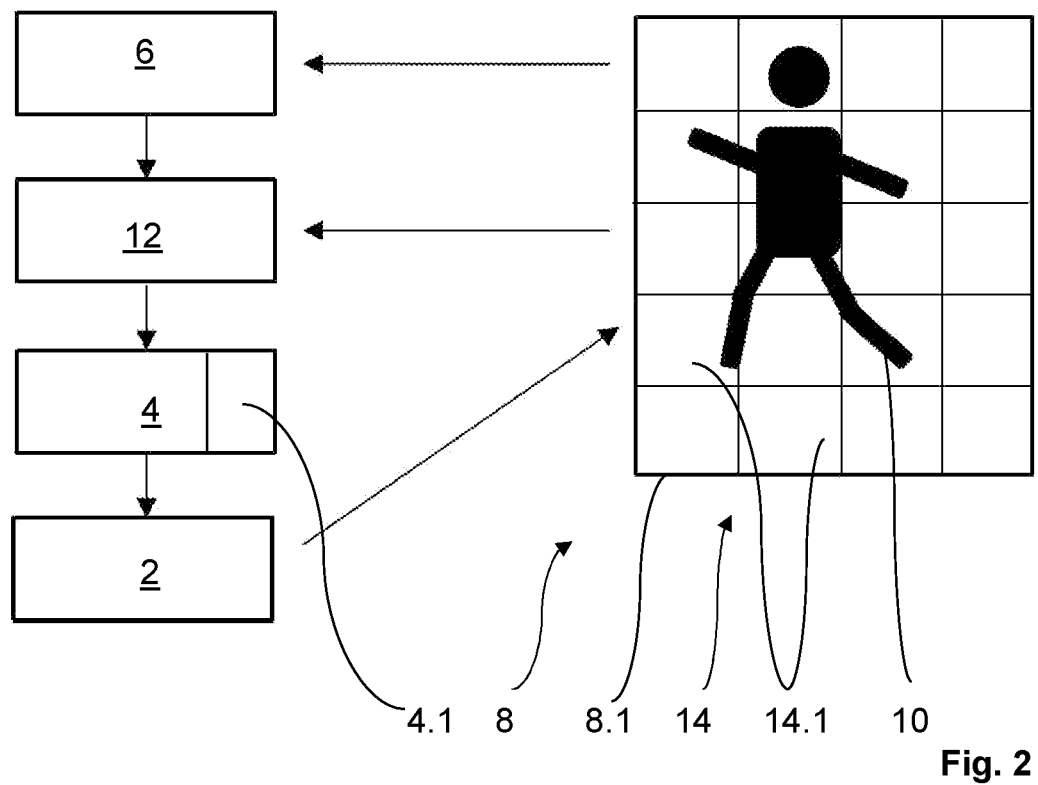
FIG. 2 shows an exemplary embodiment of the lamp unit according to the invention in a partial representation.

FIG. 2 shows an exemplary embodiment of the lamp unit according to the invention in a partial representation. In contrast to the first exemplary embodiment, a totality 14 of detected object 10 classified as relevant and its object surroundings 8.1 is divided into subareas 14.1, and the light intensity of light modules 2 of the two main headlamps is formed during the normal operation of the lamp unit in each of subareas 14.1 in such a way that the luminance contrast between object 10 and its object surroundings 8.1 is at its maximum for each of subareas 14.1 within the technical limits of the lamp unit. The technical limits of the lamp unit are, for example, the resolution possible with light modules 2 of the light emitted by the two light modules 2. If the individual light module is an LED matrix made up of individual LEDs, a different possible resolution results than, for example, with a combination of an LED matrix and a liquid crystal display connected downstream from this LED matrix in the light propagation direction; liquid crystal displays are also referred to as LCDs.

According to the present second exemplary embodiment, subareas 14.1 of totality 14 of detected object 10 classified as relevant and its object surroundings 8.1 thus make it possible to adapt the light intensity of light modules 2 for each of the subareas 14.1, in contrast to the first exemplary embodiment. Each subarea 14.1 may be illuminated at an individual light intensity of light modules 2 to achieve a preferably high luminance contrast between object 10 and its object surroundings 8.1 for this particular subarea 14.1. For example, subareas 14.1, into which object 10 does not extend, subareas 14.1, which are partially filled with object 10, and subareas 14.1, which are completely filled with object 10, may each be illuminated differently from each other. The luminance contrast between object 10 and its object surroundings 8.1 as a whole may be optimized hereby, namely maximized within the technical limits of the lamp unit.

An advantageous refinement, which is associated with the formation of a totality 14 of detected object 10 classified as relevant and its object surroundings 8.1, and the division thereof into subareas 14.1, provides that the luminance detection device for detecting the luminances of detected object 10 classified as relevant detects the luminances of object 10 and its object surroundings 8.1 for individual subareas 14.1 of totality 14 in front surroundings 8 of the vehicle and in object surroundings 8.1 of front surroundings 8 around this object 10.

Figure 3:
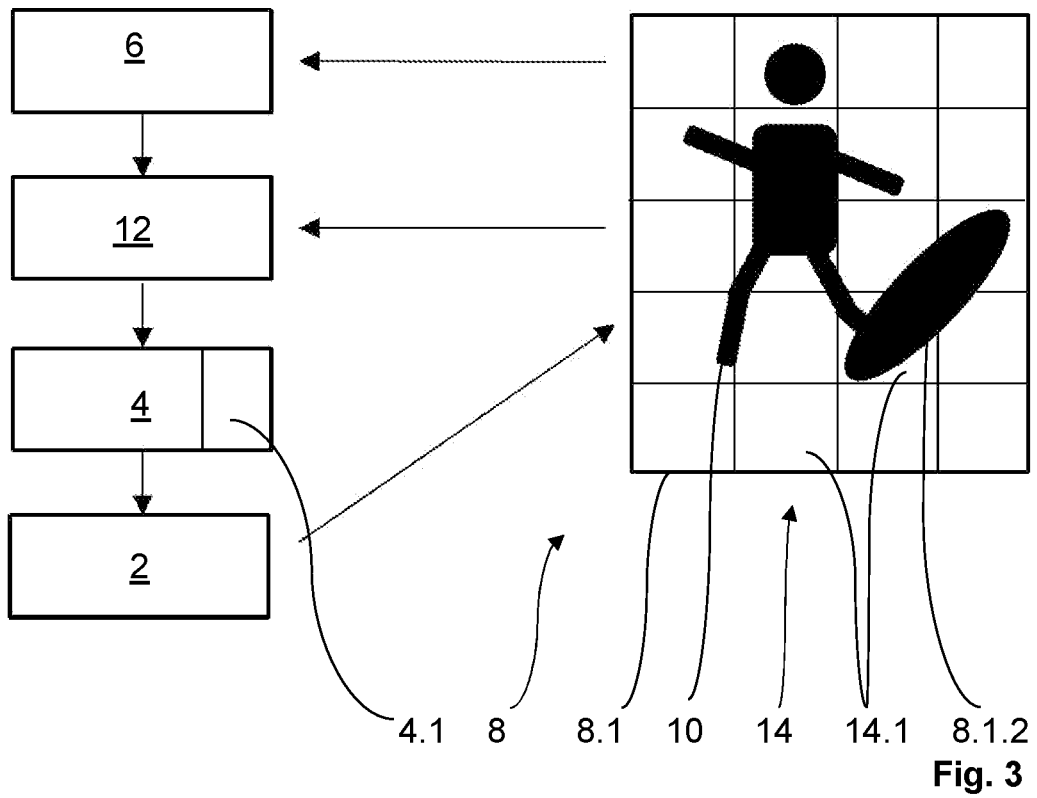
FIG. 3 shows an exemplary embodiment of the lamp unit according to the invention in a partial representation.

FIG. 3 shows an exemplary embodiment of the lamp unit according to the invention in a partial representation.

In contrast to the two aforementioned exemplary embodiments, object surroundings 8.1 in the present third exemplary embodiment are illuminated in such a way that object surroundings 8.1 of object 10 are able to be perceived by a vehicle driver of the motor vehicle in part as an object shadow 8.1.2 of detected object 10 classified as relevant. For example, it may be provided to not eclipse a real object shadow of the object in the object surroundings with the aid of the light modules or to cause the real object shadow to stand out even more clearly with the aid of the two light modules. However, it is also conceivable, as illustrated in FIG. 3, to add a virtual object shadow 8.1.2 to a detected object 10 classified as relevant in its object surroundings 8.1 with the aid of light modules 2 of the two main headlamps. The profile of virtual object shadow 8.1.2 of object 10 may be formed, for example, depending on other shadows of other object detected in front surroundings 8 of the motor vehicle with the aid of front camera 6. Shadows and objects of this type are not illustrated in FIG. 3.

Similarly to the second exemplary embodiment, third exemplary embodiment also has a totality 14 made up of detected object 10 classified as relevant and its object surroundings 8.1, the totality being divided into subareas 14.1. The light intensity of light modules 2 of the two main headlamps is formed during the normal operation of the lamp unit in each of subareas 14.1 in such a way that the luminance contrast between object 10 and its object surroundings 8.1 is at its maximum for each of the subareas 14.1 within the technical limits of the lamp unit.

The invention is not limited to present exemplary embodiment. For example, the classification of the object detected with the aid of the surroundings detection device may also be implemented by other input variables and also independently of a danger potential for the vehicle and/or the object with the aid of the light controller. Those skilled in the art will select the suitable input variables depending on the application. The classification of the object as relevant may also take place, for example, depending on at least one vehicle state. Accordingly, the input variable for the classification would then be an output variable of a vehicle component of the vehicle. A classification depending on a combination of vehicle state variables and surroundings variables detected by the surroundings detection device is also conceivable.

The luminance detection device may be designed as a separate device as well as in combination with another device of the vehicle, for example the surroundings detection device.

Instead of a front camera, other suitable surroundings detection devices known to those skilled in the art for detecting the front surroundings of a vehicle and objects present in the front surroundings of the vehicle are also possible.

In contrast to the three exemplary embodiments, it is also conceivable that the increase in or reduction of the light intensity takes place depending on a value of the luminance contrast between the object and the object surroundings. The light intensity in the area of the detected object classified as relevant would thus be increased or reduced by a relative value.

In another specific embodiment of the method according to the invention, it may be provided that, when detecting the luminosities with the aid of the luminance detection device, the object detected with the aid of the surroundings detection device and classified as relevant with the aid of the light controller is illuminated at a light intensity automatically varied within a detection period of the luminosities from a light intensity variation range of the light module, and the front surroundings of the vehicle are illuminated at a time after the detection of the luminosities during a normal operation of the lamp unit, at least in an area of the object, at the light intensity from the light intensity variation range, for which the luminance contrast between the object and the object surroundings is at its maximum. For example, an illumination light quantity of 0% of the maximum illumination quantity up to 100% of the maximum illumination light quantity of the light module, which is available with the aid of the at least one light module, is emitted for this purpose during the detection time, the illumination light quantity being continuously increased from 0% to 100% of the maximum illumination light quantity of the light module. With the aid of the luminance detection device and the light controller, the illumination light quantity of the light module is subsequently selected for the normal operation of the lamp unit for the illumination at least in the area of the detected object classified as relevant, at which the luminance contrast between the object and its object surroundings was at its maximum.

The invention also relates to a computer program product, comprising commands which cause the lamp unit according to the invention, for example according to the present exemplary embodiments, to carry out the method according to the invention, for example, according to the present exemplary embodiments, as well as a computer-readable medium, on which a computer program product of this type is stored.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling at least one light module of a lamp unit of a vehicle, comprising at least one light module, a light controller for automatically controlling the at least one light module and a surroundings detection device for detecting front surroundings of the vehicle, the method comprising:
   illuminating the front surroundings of the vehicle with the light controller and the at least one light module depending on an object detected by the surroundings detection device in the front surroundings of the vehicle and classified as relevant by the light controller, such that the front surroundings of the vehicle are illuminated depending on a detected object classified as relevant;
   detecting, via a luminance detection device, luminances of the detected object classified as relevant in the front surroundings of the vehicle and object surroundings of the front surroundings that are around the detected object classified as relevant; and
   illuminating the front surroundings of the vehicle depending on a luminance contrast between the detected object classified as relevant and the object surroundings, the luminance contrast being ascertained by the light controller,
   wherein, depending on the luminance contrast, a positive contrast or a negative contrast of the detected object classified as relevant, with respect to the object surroundings, is determined by the light controller, and wherein if the positive contrast exists, a light intensity of the at least one light module is increased in the area of the detected object classified as relevant, and if the negative contrast exists, the light intensity of the at least one light module is reduced in the area of the detected object classified as relevant, and
   wherein the positive contrast indicates that the detected object classified as relevant has a higher luminance than the object surroundings and the negative contrast indicates that the detected object classified as relevant has a lower luminance than the object surroundings.

2. The method according to claim 1, wherein the object detected with the aid of the surroundings detection device is classified as relevant by the light controller depending on a danger potential for the vehicle and/or the object.

3. The method according to claim 1, wherein the light intensity in the area of the detected object classified as relevant is increased or reduced by a predefined absolute value stored in a memory of the light controller.

4. The method according to claim 1, wherein the increase or reduction of the light intensity depends on a value of the luminance contrast between the detected object classified as relevant and the object surroundings.

5. The method according to claim 1, wherein, when detecting the luminances with the luminance detection device, the detected object classified as relevant is illuminated at a light intensity automatically varied within a detection period of the luminances from a light intensity variation range of the at least one light module, and wherein the front surroundings of the vehicle are illuminated at a time after the detection of the luminances during a normal operation of the lamp unit, at least in an area of the detected object classified as relevant, at a light intensity from the light intensity variation range for which the luminance contrast between the detected object classified as relevant and the object surroundings is at a maximum.

6. The method according to claim 1, wherein a totality of the detected object classified as relevant and the object surroundings is divided into subareas, and a light intensity of the at least one light module is formed during a normal operation of the lamp unit in each of the subareas such that the luminance contrast between the detected object classified as relevant and the object surroundings is at a maximum for each of the subareas within technical limits of the lamp unit.

7. The method according to claim 1, wherein the object surroundings of the detected object classified as relevant are illuminated such that the object surroundings are perceived by a vehicle driver of the vehicle as an object shadow of the detected object classified as relevant.

8. The lamp unit for the vehicle for carrying out the method according to claim 1, the lamp unit comprising:
   the at least one light module;
   the light controller for automatically controlling the at least one light module; and
   the surroundings detection device for detecting the front surroundings of the vehicle, the front surroundings of the vehicle being illuminated with the light controller and the at least one light module depending on the object detected by the surroundings detection device in the front surroundings of the vehicle and classified as relevant by the light controller, such that the fronts surroundings of the vehicle are illuminated depending on the detected object classified as relevant; and
   the luminance detection device for detecting luminances of the detected object classified as relevant in the front surroundings of the vehicle and the object surroundings of the front surroundings that are around the detected object classified as relevant,
   wherein the front surroundings of the vehicle are illuminated depending on the luminance contrast between the detected object classified as relevant and the object surroundings, the luminance contrast being ascertained by the light controller,
   wherein, depending on the luminance contrast, the positive contrast or the negative contrast of the detected object classified as relevant, with respect to the object surroundings, is determined by the light controller, and wherein if the positive contrast exists, a light intensity of the at least one light module is increased in the area of the detected object classified as relevant, and if the negative contrast exists, the light intensity of the at least one light module is reduced in the area of the detected object classified as relevant, and
   wherein the positive contrast indicates that the detected object classified as relevant has a higher luminance than the object surroundings and the negative contrast indicates that the detected object classified as relevant has a lower luminance than the object surroundings.

9. A non-transitory computer readable medium having computer program commands stored thereon which cause the lamp unit to carry out the method steps of the method according to claim 1.

* * * * *